(12) United States Patent
Bassett

(10) Patent No.: US 8,600,565 B2
(45) Date of Patent: Dec. 3, 2013

(54) INDEPENDENT AUGER OPERATION

(75) Inventor: William Bassett, Brodhead, WI (US)

(73) Assignee: Kuhn North America, Inc., Brodhead, WI (US)

( * ) Notice: Subject to any disclaimer, the term of this patent is extended or adjusted under 35 U.S.C. 154(b) by 361 days.

(21) Appl. No.: 12/949,358

(22) Filed: Nov. 18, 2010

(65) Prior Publication Data

US 2012/0130543 A1    May 24, 2012

(51) Int. Cl.
G05D 7/00  (2006.01)
G06F 19/00 (2011.01)

(52) U.S. Cl.
USPC ............ 700/282; 700/285; 366/141; 56/341; 460/1

(58) Field of Classification Search
USPC ......... 700/214–216, 285, 282; 56/341; 460/1; 366/141, 270, 297
See application file for complete search history.

(56) References Cited

U.S. PATENT DOCUMENTS

| | | | |
|---|---|---|---|
| 5,005,980 A | 4/1991 | Zimmerman | |
| 5,281,023 A * | 1/1994 | Cedillo et al. | 366/17 |
| 5,441,340 A * | 8/1995 | Cedillo et al. | 366/2 |
| 5,462,354 A | 10/1995 | Neier | |
| 5,584,762 A | 12/1996 | Buhler et al. | |
| 6,536,939 B1 * | 3/2003 | Blue | 366/297 |
| 6,572,257 B2 | 6/2003 | Bump | |
| 6,758,426 B2 | 7/2004 | Have | |
| 7,341,372 B2 | 3/2008 | Van Der Plas | |
| 7,347,614 B2 | 3/2008 | Cicci et al. | |
| 7,766,105 B2 | 8/2010 | Albright et al. | |
| 2009/0177313 A1 * | 7/2009 | Heller et al. | 700/216 |
| 2009/0238032 A1 * | 9/2009 | Mcfarlane et al. | 366/270 |
| 2010/0150692 A1 | 6/2010 | Digman | |
| 2010/0242427 A1 | 9/2010 | Anstey et al. | |

OTHER PUBLICATIONS

International Search Report and Written Opinion issued Mar. 8, 2012 in patent application No. PCT/US11/57009 filed Oct. 20, 2011.

* cited by examiner

*Primary Examiner* — Kavita Padmanabhan
*Assistant Examiner* — Douglas Lee
(74) *Attorney, Agent, or Firm* — Oblon, Spivak, McClelland, Maier & Neustadt, L.L.P.

(57) ABSTRACT

A control system for controlling augers that includes a data input unit and a processing unit. The processing unit receives data input from the data input unit and generates and distributes output signals that are derived from the data input. Each of the output signals includes a control setting for at least a first auger. The control setting includes a position for the first auger relative to a position of a second auger in order to gain greater control during a variety of processing stages.

30 Claims, 10 Drawing Sheets

| | | Hay | |
|---|---|---|---|
| Stage | Property | Front Auger | Rear Auger |
| Processing | Position | | |
| | Speed (RPM) | 21-26 | 21-26 |
| | Rear Auger Δθ = | 0° | |
| Mixing | Position | N/A | N/A |
| | Speed (RPM) | N/A | N/A |
| | Rear Auger Δθ = | N/A | |
| Unloading | Position | | |
| | Speed (RPM) | 25-40 | 25-40 |
| | Rear Auger Δθ = | 30° CCW | |

FIG. 7A
| Stage | Property | Hay | |
|---|---|---|---|
| | | Front Auger | Rear Auger |
| Processing | Position | 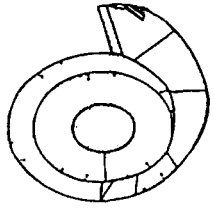 | 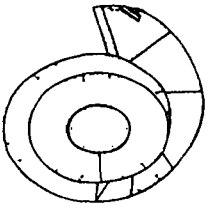 |
| | Speed (RPM) | 21-26 | 21-26 |
| | Rear Auger Δθ = | 0° | |
| Mixing | Position | N/A | N/A |
| | Speed (RPM) | N/A | N/A |
| | Rear Auger Δθ = | N/A | |
| Unloading | Position | 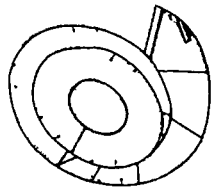 | 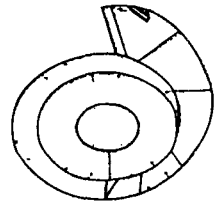 |
| | Speed (RPM) | 25-40 | 25-40 |
| | Rear Auger Δθ = | 30° CCW | |

FIG. 7B
| Stage | Property | Grain | |
|---|---|---|---|
| | | Front Auger | Rear Auger |
| Processing | Position | N/A | N/A |
| | Speed (RPM) | N/A | N/A |
| | Rear Auger Δθ = | N/A | |
| Mixing | Position | 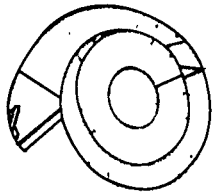 | 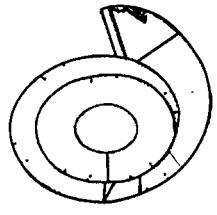 |
| | Speed (RPM) | 36 | 36 |
| | Rear Auger Δθ = | 120° CW | |
| Unloading | Position | 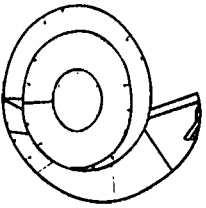 | 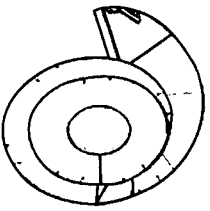 |
| | Speed (RPM) | 20-40 | 20-40 |
| | Rear Auger Δθ = | 90° CCW | |

FIG. 7C
| Stage | Property | Front Auger | Rear Auger |
|---|---|---|---|
| Hay/Grain Mixture | | | |
| Processing | Position | 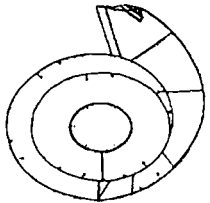 | 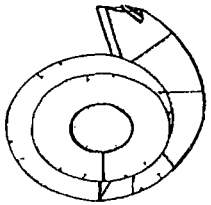 |
| | Speed (RPM) | 21-26 | 21-26 |
| | Rear Auger $\Delta\theta =$ | 0° | |
| Mixing | Position | 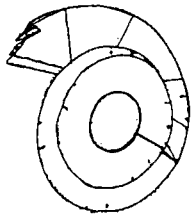 | 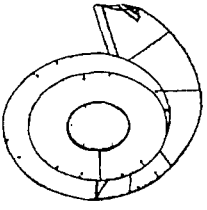 |
| | Speed (RPM) | 30 | 30 |
| | Rear Auger $\Delta\theta =$ | 60° CW | |
| Unloading | Position | 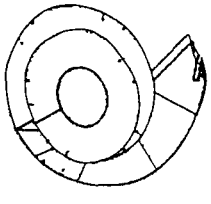 | 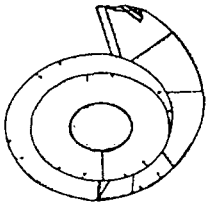 |
| | Speed (RPM) | 25-40 | 25-40 |
| | Rear Auger $\Delta\theta =$ | 60° CCW | |

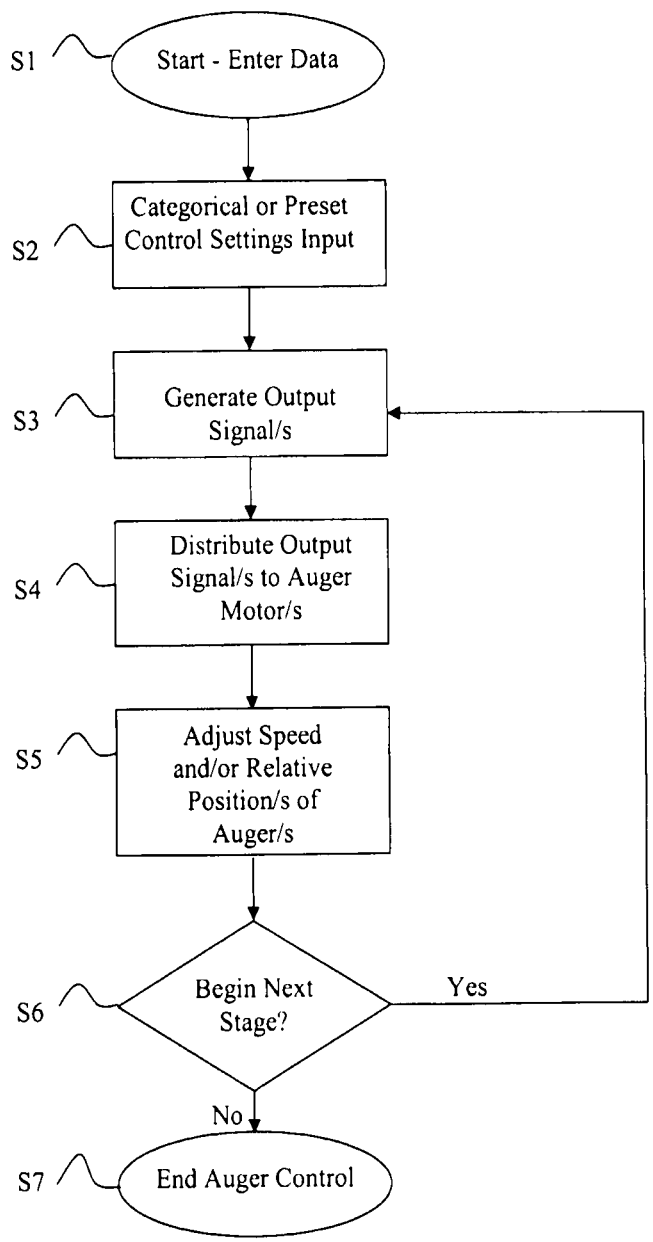

INDEPENDENT AUGER OPERATION

BACKGROUND

1. Field

The embodiments discussed herein relate to a control system for an auger mixing apparatus. More specifically, a control system for an auger mixing apparatus that is configured to individually control each auger attached thereto is described.

2. Description of the Related Art

The auger mixing apparatus of interest in this application is typically used for purposes related to farming. Additionally, the types of machines implementing such auger mixers vary, including trucks, trailers, and stationary mixers. In particular, auger mixing apparatuses are typically used to process hay and grain for animal feed purposes.

Advances in auger technology have improved animal feed quality, processing time, and discharge rate/evenness. The quality of the animal feed and the efficient use of the auger mixing machine are, in large part, dependent on the processing performed by the augers. Therefore, one way to improve the feed quality is to have greater control of the features of the mixing machine.

In order to ensure high quality feed and optimal use of the machine, operators typically consider multiple processing factors. Processing factors include, for example: the kind of material being processed, such as hay or grain; the overall weight of the materials being processed; the stage of processing, such as unloading, mixing, and cleaning; and the location of the door with respect to the augers.

Depending, therefore, on the processing factors such as those described above, an operator may want to manipulate the control settings of the mixing machine. A few techniques have been commonly used to manipulate the control of the augers to process the feed without causing excessive damage and to clean and prepare the mixer for subsequent use. For example, one related auger mixing apparatus allows the operator of the machine to start or stop each mixing auger separately. In a different related auger mixing apparatus, the operator is able to control the overall machine speed, thereby increasing or decreasing the speed for all augers simultaneously.

Although control of the auger speed is helpful, each of the related examples is limited to the ability to manipulate the speed. In one example, although the speed is variable, all of the augers rotate at the same rate. In the other example, although the speed of one auger can be reduced to zero (i.e. the auger is turned off) while another auger can continue rotating, the machine does not allow for individual variance in the speed while multiple augers are turning.

Another problem with the above-mentioned related examples is that the level of experience required to efficiently use the machine without ruining the feed quality. Even though the speed of the auger is alterable, an inexperienced operator may not have the understanding of what speeds are best suited for the varying processing factors mentioned above.

Yet another problem with the above-mentioned related examples is that the only control setting that can be manipulated is the speed of the auger. Neither of the related examples allows for controlled manipulation of the auger position. As such, it is difficult for an operator to alter the relative positions of augers to improve feed processing depending on the stage. Currently, to offset the position of the augers, an operator can alter the position either mechanically or by timing the auger rotation. To alter the auger position mechanically, an operator may need to manually disassemble and reassemble the auger parts. To alter the auger position by timing, an operator needs to try and time when to start and stop each auger individually, so that the leading edge of the fighting stops at the desired location. Both options, manually adjusting the augers and timing to adjust the augers, are often inconvenient and inefficient.

Therefore, it is shown that the currently known devices do not permit individual control of each auger for both position and the individual speed of each auger, which control is desirable.

SUMMARY

One embodiment of the present invention provides a control system for controlling a plurality of augers, which includes a data input unit and a processing unit. The processing unit is configured to receive data input from the data input unit and to generate and distribute a plurality of output signals that are derived from the data input. Each of the plurality of output signals includes at least one control setting for a first auger. The control setting includes a position for the first auger relative to a position for a second auger.

Another embodiment of the present invention provides a method of controlling each of a plurality of augers independently through a control system. The method includes receiving, in a processing unit, data input from a data input unit and generating, in the processing unit, a plurality of output signals that are derived from the data input. Each of the plurality of output signals includes at least one control setting for a first auger. The control setting includes a position for the first auger relative to a position for a second auger. The method also includes distributing the plurality of output signals.

Yet another embodiment of the present invention provides an auger mixing apparatus. The auger mixing apparatus includes a plurality of augers; a motor attached to each of the plurality of augers; and a control system configured to output auger control settings to each motor individually. The control settings include at least a position for one or more augers of the plurality of augers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

FIG. 7A is a table showing processing properties for hay in the vertical mixer trailer of FIG. 5 according to an exemplary embodiment of the invention;

FIG. 7B is a table showing processing properties for grain in the vertical mixer trailer of FIG. 5 according to an exemplary embodiment of the invention;

FIG. 7C is a table showing processing properties for a hay/grain mixture in the vertical mixer trailer of FIG. 5 according to an exemplary embodiment of the invention; and FIG. 8 is a flowchart of the process of controlling augers in a mixing apparatus according to an exemplary embodiment of the invention.

DETAILED DESCRIPTION

In the following, the present advancement will be discussed by describing a preferred embodiment with reference to the accompanying drawings. However, those skilled in the art will realize other applications and modifications within the scope of the disclosure as defined in the enclosed claims.

It is determined that the mixing, processing, and unloading quality of feed, including hay or other feed grasses, grain, and/or a plurality of combinations of feed, can be improved by manipulating how the feed is processed. Such manipulation may improve the processing speed, require less power, and provide quicker unloading. Therefore, greater command over the control settings of the augers in an auger mixing machine is desired. For example, the control settings used, such as the speed and angular position of the augers, during the unloading stage of feed processing may be different than the control settings desired for use during the cleaning or mixing stage of the feed processing.

Figure 1:
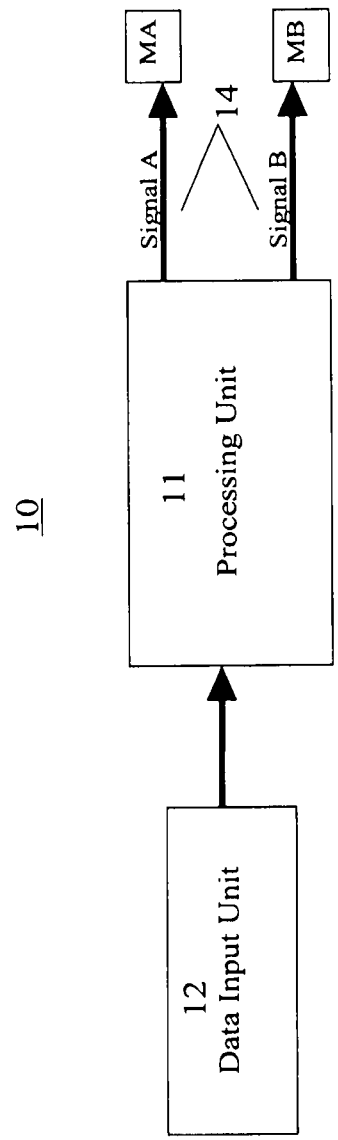
FIG. 1 is a schematic drawing of a control system for an auger mixing machine according to an exemplary embodiment of the invention.

The invention is best understood when read in conjunction with the accompanying drawings. With reference to FIG. 1, a schematic for a control system 10 for an auger mixer is shown. The control system 10 includes a data input unit 12 and a processing unit 11. The processing unit 11 receives data input from the data input unit 12 and distributes one or more output signals 14, such as signal A and signal B. The output signals 14, such as signal A and signal B control one or more motors A, B attached to the control system 10.

Depending on the desired settings for processing the feed, an operator may enter the data input either manually or by selecting a preset setting. The data input unit 12 may include analog controls, such as knobs, levers, and/or switches (not shown); and/or it may include a digital control unit (not shown), which provides the operator with a way to: manually select specific desired settings; manually enter information regarding the processing factors so that the processing unit 11 determines the settings; or select predetermined settings applicable to the processing factors.

Some processing factors that are often considered when determining the control settings are, for example: the material being processed, the stage of processing, the weight of the material, and the expected torque required of the augers for the particular stage of processing. Based on such factors, an operator may choose to enter individual auger settings manually, or the operator may select a predetermined and preset setting that corresponds to the factors.

After either inputting data related to the factors described above or choosing a predetermined setting, the processing unit 11 distributes one or more output signals 14 to corresponding motors that control the augers. Based on the output signal received, the motors then adjust control settings for each auger independently of the others. The control settings adjusted are the speed and/or angular position for each auger attached.

In one example, to choose a predetermined and preset control setting, an operator that wants to mix hay and grain may enter in the data input unit 12: the stage of mixing, the materials of hay and grain, and the weight of the material, if known. Based on such information, a predetermined setting will then automatically rotate the augers to the correct offset positions and will adjust the speeds accordingly for the chosen stage.

In one example, a weight sensor is used to weigh the materials placed in the auger mixing apparatus automatically. The weight is then factored in, typically without requiring such input from the operator.

Figure 2:
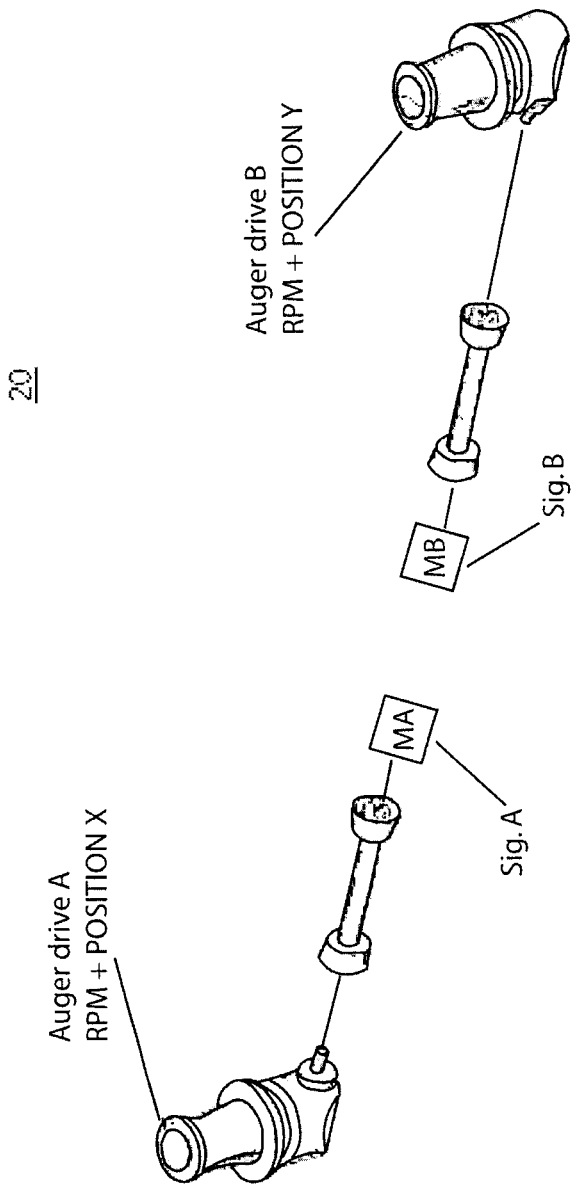
FIG. 2 is a perspective view of a drive system for use in auger mixing machines implementing the control system of FIG. 1, according to an exemplary embodiment of the invention.
Figure 3:
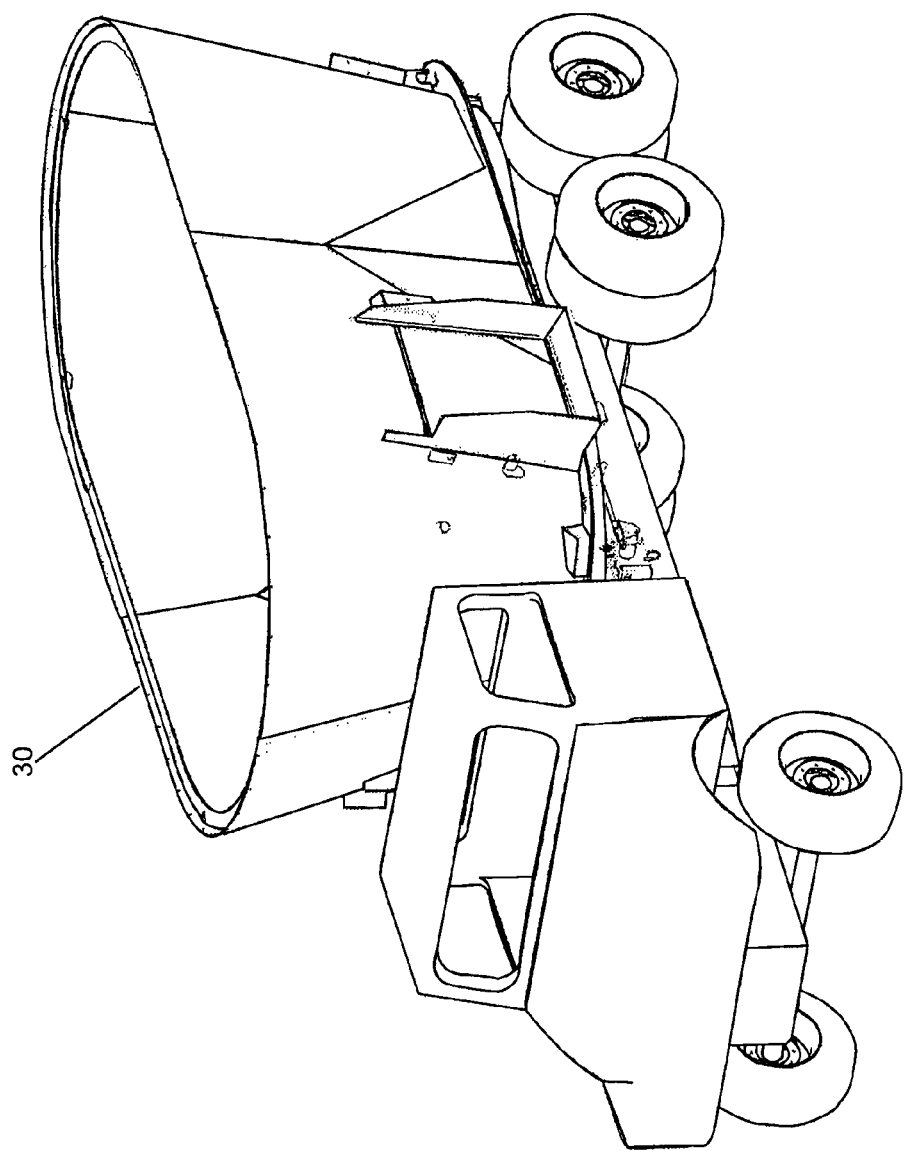
FIG. 3 is a perspective view of a vertical mixer truck, in which the control system of FIG. 1 can be implemented, according to an exemplary embodiment of the invention.
Figure 4:
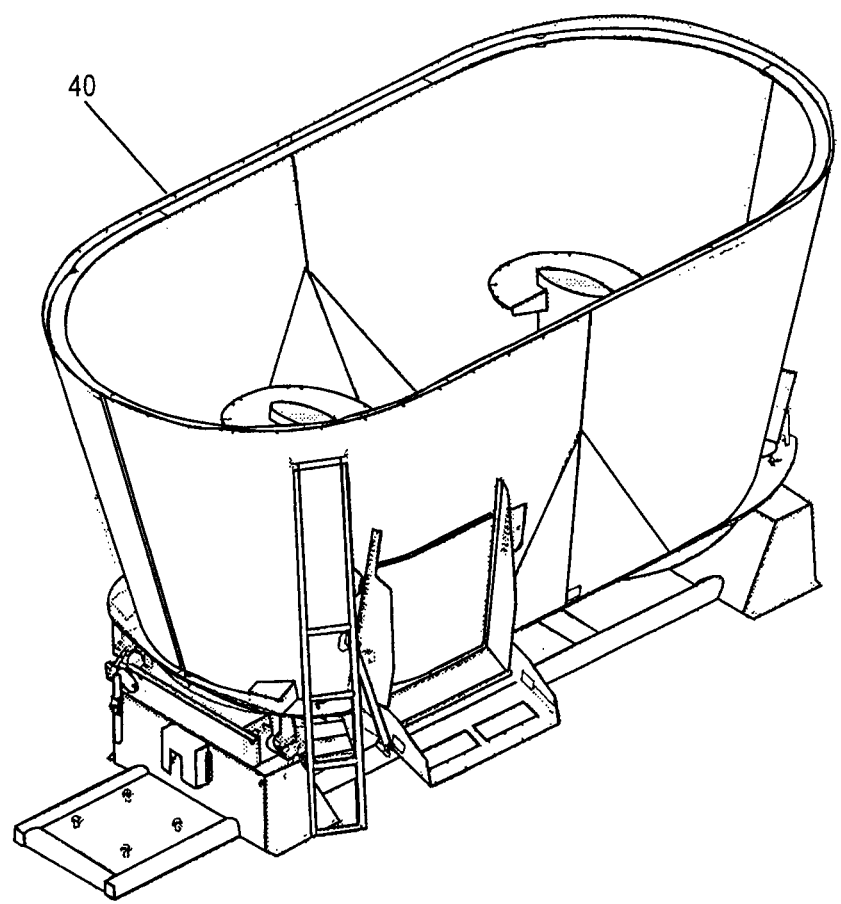
FIG. 4 is a perspective view of a stationary vertical mixer, in which the control system of FIG. 1 can be implemented, according to an exemplary embodiment of the invention.
Figure 5:
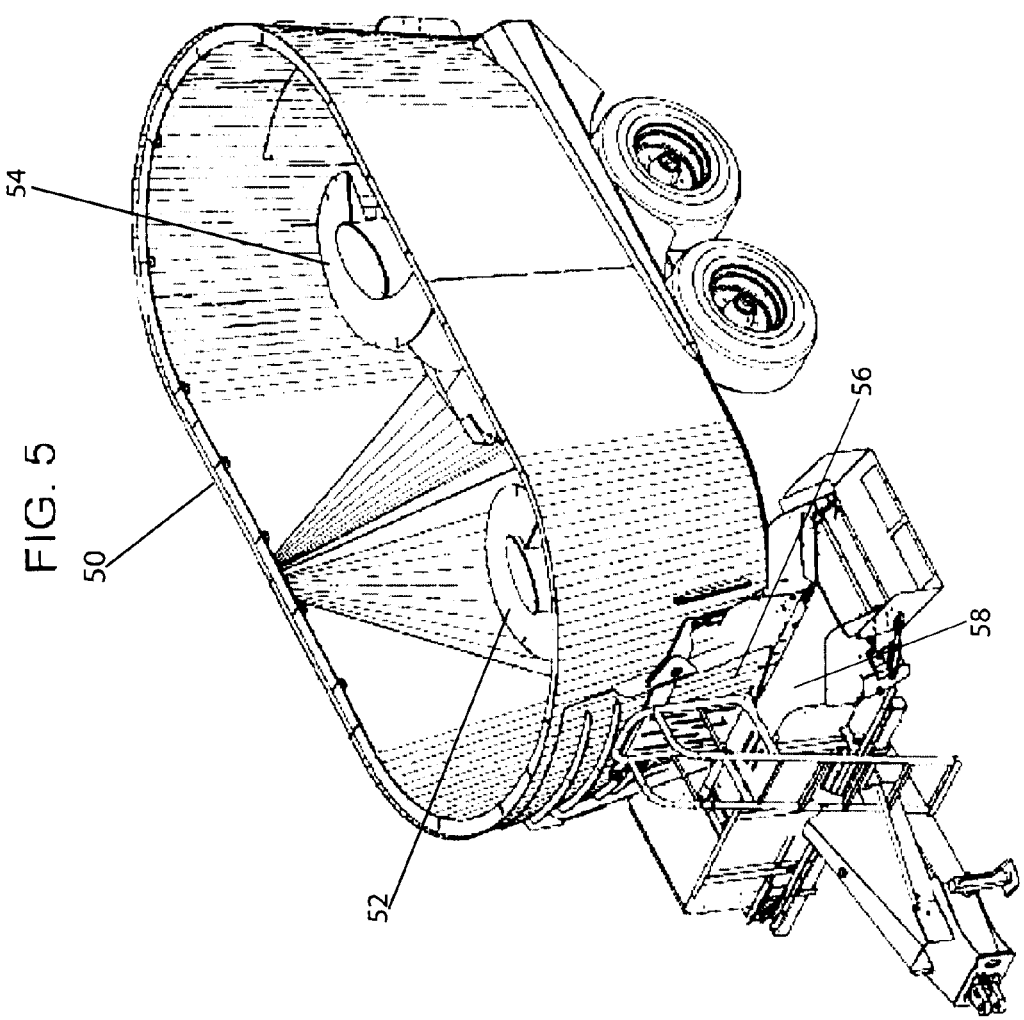
FIG. 5 is a perspective view of a vertical mixer trailer, in which the control system of FIG. 1 can be implemented, according to an exemplary embodiment of the invention.

FIG. 2 is a perspective view drawing of a drive system 20 as configured to be implemented in an auger mixing machine (see FIGS. 3-5). Although the drive system 20 as shown includes only two auger drives A and B, additional augers may be included. In addition to the auger drives A and B, the auger drive system 20 includes a motor MA attached to auger drive A and a motor MB attached to auger drive B. The motors MA and MB are configured to be connected to the control system 10 and receive signal A and signal B, respectively. Accordingly, auger drive A will be driven at a certain speed, and may be offset from auger drive B in a certain position, in accordance with signal A. Similarly, auger drive B will be driven at a certain speed, and may be offset from auger drive A in a certain position, in accordance with signal B.

FIGS. 3-5 are exemplary embodiments of the forms of machinery on which the control system 10 can be implemented. FIG. 3 depicts a vertical mixer truck 30, which can be used to process the feed and, if desired, distribute it simultaneously along a driven path. In FIG. 4, a perspective view of a stationary vertical mixer 40 is shown. A stationary vertical mixer is useful for processing feed in a stationary location and then distributing the feed via other mobile means. Another exemplary embodiment of a machine for implementing the control system 10 is a vertical mixer trailer 50, as shown in FIG. 5. The vertical mixer trailer 50 is portable and can be moved around by a variety of other means.

Figure 6:
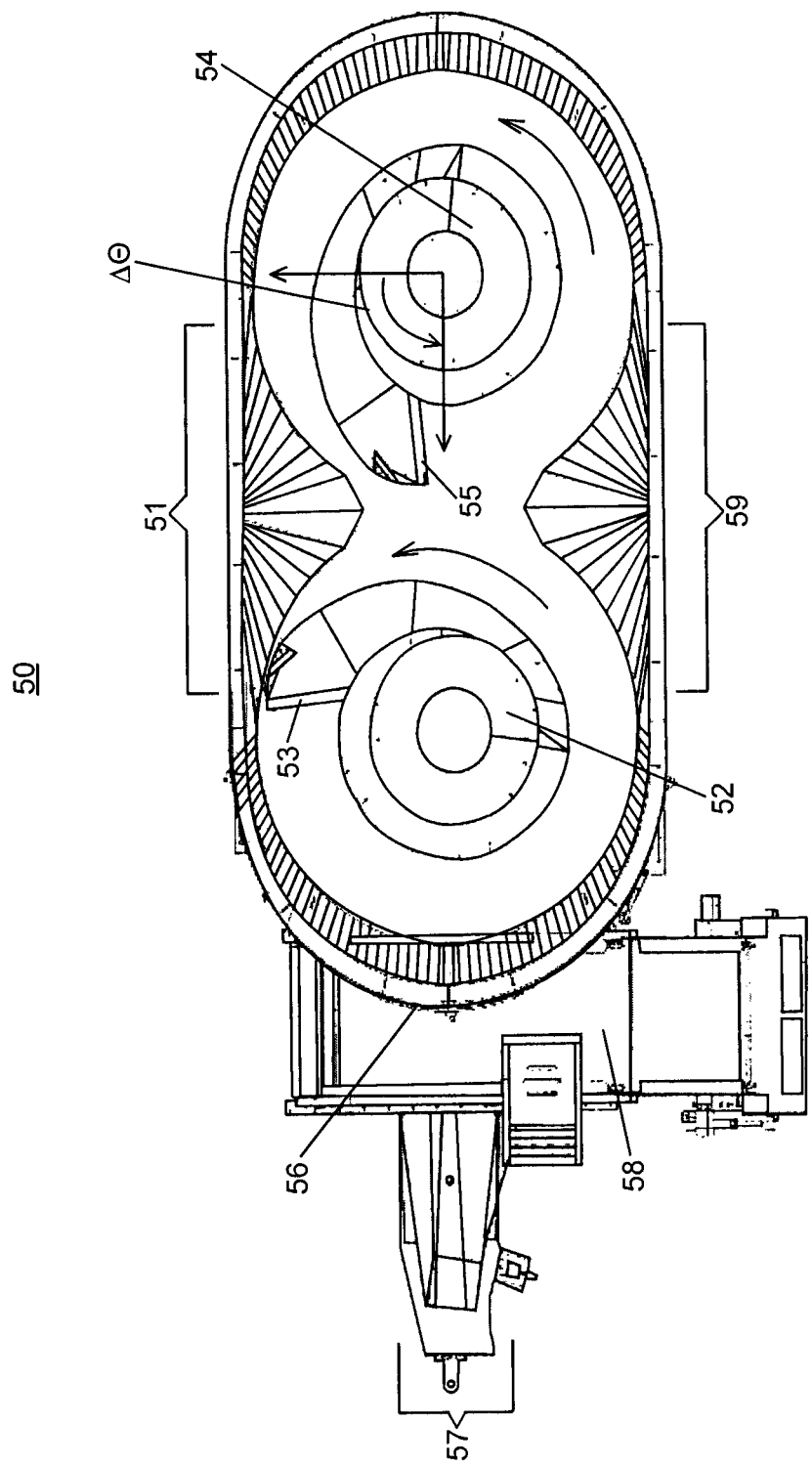
FIG. 6 is a top view of the vertical mixer trailer in FIG. 5 according to an exemplary embodiment of the invention.

FIG. 6 shows a top view of a vertical mixer trailer with the augers in random positions. Although the following detailed discussion regarding the positioning of the augers is made with respect to a vertical mixer trailer 50, it is understood that one skilled in the art will realize other applications and modifications which can be adapted in any variety of machinery that implements auger mixing, such as the vertical mixer truck 30 and the stationary vertical mixer 40 mentioned above.

With respect to FIG. 6, the vertical mixer trailer 50 includes a front auger 52 proximate to the front end 57 of the mixing trailer 50 and a rear auger 54. The trailer 50 also has a right side 51 and a left side 59. Each auger 52 and 54 has a helical flighting that is designed to cut and mix animal feed and/or biosolids, which may include hay and/or grains. The leading edges 53 and 55 of the helical flightings are at the outer end of the portion of the augers 52 and 54 that scrapes along the floor of the trailer 50. Once the feed is mixed sufficiently, the augers 52 and 54 discharge the feed from the trailer 50 through a door 56 onto a distributor 58, where the feed passes for distribution.

Greater control over an auger setting such as the angular position typically improves the quality and speed of mixing, processing, and unloading the feed, and may also help minimize power requirements. Further, the quality of the feed can be affected by varying the angular offset positions of the individual augers. These positions change for the various stages of processing and the material being processed. Specifically, during one stage, the angular position of the leading edge of the helical fighting on one auger, may be offset from the position of the leading edge of the helical flighting on a different auger; and during a different stage, the positions may change again. As such, a discussion of how the relative positions are determined is provided below.

The relative position of each auger is typically determined by the location of the leading edge of the helical flighting on each auger with respect to the leading edge of the helical flighting on the front auger in the mixing apparatus, where the relative angular difference is measured in the direction of rotation. However, the position may also easily be measured with respect to any other radial point on the helical fighting, so long as the same corresponding radial point is selected on the other augers as well. For example, if a knife (not shown) or a kicker (not shown) is attached the helical flighting of the augers, the angular position of the augers may be determined by the relative angular difference between the location of corresponding knives or kickers. Furthermore, the difference of the angular position between the augers is typically discussed in terms of the hours on an analog clock. As such, the position of the leading edge of the helical flighting of the front auger is typically stated as pointing to a particular hour on an imaginary clock, and the positions of the other augers are adjusted with respect to the front auger. For example, in FIG. 6, the leading edge 53 of the helical flighting on the front auger 52 is typically considered to be approximately at the position of 3 o'clock, indicating that 12 o'clock is on the front end 57 of the trailer 50 (left of FIG. 6), and thus, 6 o'clock is on the rear of the trailer 50 (right of FIG. 6). As such, the leading edge 55 of the helical fighting on the rear auger 54 is considered to be approximately at the position of 12 o'clock, relative to the front auger 52.

Although the angular position of an auger is typically discussed in terms of an analog clock, note that it is merely a convenience to define the positions of the augers with respect to each other in terms of numerical positions on an imaginary clock. Therefore, for the purposes of the following discussion, the relative positions of the augers are described as the relative difference of the smallest radial angle θ between the leading edges 53 and 55 of the helical flightings on the front and rear augers 52 and 54, in either the clockwise (CW) or counter-clockwise (CCW) rotational direction. For clarity, the CCW rotational direction is shown by the arrows beside the augers 52 and 54 in FIG. 6. As such, the angular position of the rear auger is defined by the smallest angle of difference Δθ between the position of the leading edges of the front and rear augers. For example, in FIG. 6, the angular position Δθ of rear auger 54 is approximately 90° CCW from the front auger 52.

In FIGS. 7A-7C, the angular positions shown of the front and rear augers 52 and 54 are exemplary positions based on the stage of processing and the material being processed. In particular, FIGS. 7A-7C show angular positions and speeds for the processing, mixing, and unloading stages of hay (FIG. 7A), grain (FIG. 7B), and a hay/grain mixture (FIG. 7C). Note also that the angular positions of the augers may change within each individual stage, if desired.

Accordingly, FIG. 7A shows an exemplary embodiment of the relative angular positions of the front and rear augers 52 and 54 for the hay processing and unloading stages. (A mixing stage is typically not applicable when only hay is being used for feed). In the hay processing stage, the angular position Δθ of the rear auger 54 is approximately 0° with respect to the front auger 52. During the hay processing stage, the speed of the augers typically may start at approximately 19-23 RPM, preferably about 21 RPM, until the bales are broken up, and the speed may then increase to approximately 24-28 RPM, preferably about 26 RPM. Next, in the hay unloading stage, the angular position Δθ of the rear auger 54 is approximately 30° CCW with respect to the front auger 52. Thus, in an exemplary embodiment of the present invention, the control system is programmed such that at the end of the hay processing stage, the augers rotate to the offset position shown in the unloading stage in the table of FIG. 7A, for the hay unloading stage. During the hay unloading stage, the speed of the augers may start, for example, at approximately 23-27 RPM, preferably about 25 RPM, and then near the end of the unloading stage, the angular position may change and the speed may increase to approximately 38-42 RPM, preferably about 40 RPM, to clean off the augers.

FIG. 7B shows an exemplary embodiment of the angular positions of the front and rear augers 52 and 54 for the grain mixing and unloading stages. (A processing stage is typically not applicable when only grain is being used for feed). In the grain mixing stage, the angular position Δθ of the rear auger 54 is approximately 120° CW with respect to the front auger 52. During the grain mixing stage, the speed of the augers may be approximately 34-38 RPM, preferably about 36 RPM. Next, in the grain unloading stage, the angular position Δθ of the rear auger 54 is approximately 90° CCW with respect to the front auger 52. Thus, in an exemplary embodiment of the present invention, the control system is programmed such that at the end of the grain mixing stage, the augers rotate to the offset position shown in the unloading stage in the table of FIG. 7B, for the grain unloading stage. During the grain unloading stage, the speed of the augers may start at approximately 18-22 RPM, preferably about 20 RPM, and then near the end of the unloading stage, the angular position may change and the speed may increase to approximately 38-42 RPM, preferably about 40 RPM, to clean off the augers.

In FIG. 7C, typical angular positions are shown of the front and rear augers 52 and 54 for the processing, mixing, and unloading stages of a hay/grain mixture. In the hay/grain processing stage, the angular position Δθ of the rear auger 54 is approximately 0° with respect to the front auger 52. During the hay/grain processing stage, the speed of the augers may start at approximately 19-23 RPM, preferably about 21 RPM, until the bales are broken up, and the speed may then increase to approximately 24-28 RPM, preferably about 26 RPM. In the hay/grain mixing stage, the starting angular position Δθ of the rear auger 54 is approximately 60° CW with respect to the front auger 52, and the speed of the augers may be approximately 30 RPM. Next, in the hay/grain unloading stage, the angular position Δθ of the rear auger 54 is approximately 60° CCW. Thus, in an exemplary embodiment of the present invention, the control system is programmed such that at the end of the hay/grain processing stage, the augers rotate to the offset position shown in the mixing stage as shown in the table of FIG. 7C, for the hay/grain mixing stage. During the hay/grain unloading stage, the speed of the augers may start at approximately 23-27 RPM, preferably about 25 RPM, and then near the end of the unloading stage, the angular position may change and the speed may increase to approximately 38-42 RPM, preferably about 40 RPM, to clean off the augers.

Accordingly, as mentioned above, FIGS. 7A-7C are only exemplary embodiments describing potential speeds and relative positions of the augers for processing feed. It is understood that advantages may be gained by varying the speed of the individual augers so that one auger is faster or slower than another auger. Additionally, it is understood that the relative positions as shown in FIGS. 7A-7C, as well as the speeds, can be input in various ways. The control settings may be entered manually using either an analog control unit or a digital control unit, or the control settings may be input using a predetermined and preset setting with a digital control unit.

FIG. 8 is a flowchart of an exemplary embodiment of the process of controlling the augers in a mixing apparatus. In order to use the mixing apparatus, data input is entered into the data input unit 12 (S1). The control setting data input is either input categorically or a predetermined control setting is chosen (S2). The processing unit 11 receives the control setting data input and uses the control settings entered to generate output signals 14 for controlling the auger motors (S3). The output signals 14 are distributed to the auger motors (S4) to adjust the augers into the proper relative positions that correspond with the output signals 14 and/or the speeds of the augers (S5). The control system 10 then checks to determine if a next stage of processing is to be implemented (S6), which depends on whether a predetermined setting was chosen, whether an operator desires to manually begin the next stage, or if the apparatus has completed the last stage in a standard cycle. If a next stage is required, then new output signals 14 are generated (S3) again and the procedure is repeated from S3-S6, until a next stage is not required, at which point the control system 10 stops controlling the augers (S7).

The control system for an auger mixing apparatus as described herein provides the unique ability to control each individual auger depending on the desired variable control settings. The control system of the various embodiments of the present invention is practical to use because the control system eliminates or reduces the need to either disassemble the machine in order to alter the auger position or waste time trying to manually offset auger positions. Further, predetermined settings can be preset, and therefore, operators may not require as much experience to run the machine because the speed and position for each auger is predetermined for accuracy and high quality feed.

An additional advantage of the control system described herein is that the control system may be implemented on existing auger mixers by connecting it as a retro-fit system, or the system may be installed in new auger mixers during the construction of the mixers.

Obviously, numerous modifications and variations of the present invention are possible in light of the above teachings. It is therefore to be understood that within the scope of the appended claims, the invention may be practiced otherwise than as specifically described herein.

The invention claimed is:

1. A control system of an auger mixing machine that controls a plurality of augers, comprising:
   a data input unit; and
   a processing unit configured to receive data input from the data input unit and to generate and distribute a plurality of output signals that are derived from the data input, each of the plurality of output signals including at least one control setting for a first auger, the at least one control setting including a position for the first auger relative to a position for a second auger,
   wherein the first auger is a rear auger and the second auger is a front auger, such that the position of the rear auger is determined relative to the position of the front auger,
   wherein the relative positions of the front and rear augers are angular positions defined by a smallest radial angle theta between corresponding radial points on the front and rear augers, and
   wherein the angle theta indicates the angular position of the rear auger in a clockwise or counter-clockwise direction relative to the angular position of the front auger.

2. The control system according to claim 1, wherein the data input unit includes an analog control unit configured to be operated by an operator and to generate the data input, the analog control unit including one or more of levers, knobs, and switches.

3. The control system according to claim 1, wherein the data input unit includes a digital control unit configured to be operated by an operator and to generate the data input.

4. The control system according to claim 1, further comprising:
   a plurality of motors configured to receive output signals from the processing unit, each motor configured to couple to one of the plurality of augers via an auger drive,
   wherein the plurality of motors drive the plurality of augers in accordance with the plurality of output signals received.

5. The control system according to claim 3, wherein the digital control unit is configured to permit an operator to enter information for a process to be performed by the plurality of augers, the information including one or more of a type of material being processed, a weight of the material being processed, a stage of processing the material, a torque to be applied to one or more of the plurality of augers, a rotational speed at which one or more of the plurality of augers is to perform, and the relative position of one or more of the plurality of augers.

6. The control system according to claim 1, wherein the auger mixing machine is stationary.

7. The control system according to claim 1, wherein the auger mixing machine is implemented on a portable trailer.

8. The control system according to claim 1, wherein the auger mixing machine is implemented on a truck.

9. The control system according to claim 1, wherein the radial point is a location coincident with leading edges of helical flightings of the front and rear augers, respectively.

10. The control system according to claim 1, wherein the radial point is a location on corresponding knives attached to the front and rear augers, respectively.

11. The control system according to claim 1, wherein the radial point is a location on corresponding kickers attached to the front and rear augers, respectively.

12. The control system according to claim 3, wherein the data input includes a plurality of predetermined control settings for selection by an operator via the digital control unit.

13. The control system according to claim 12, wherein the plurality of predetermined control settings are based on processing information, the processing information including one or more of a type of material being processed, a weight of the material being processed, and a stage of processing the material.

14. The control system according to claim 13, wherein the weight of the material being processed is determined by a weight sensor connected to the data input unit.

15. The control system according to claim 13, wherein one or more of the plurality of predetermined control settings defines the position of at least the first auger for a selected stage of processing relative to the position of the second auger.

16. The control system according to claim 1, wherein the at least one control setting for the first auger further includes a rotational speed.

17. A method of controlling each of a plurality of augers independently through a control system of an auger mixing machine, the method comprising:
- receiving, in a processing unit, data input from a data input unit;
- generating, in the processing unit, a plurality of output signals that are derived from the data input, each of the plurality of output signals including at least one control setting for a first auger, the at least one control setting including a position for the first auger relative to a position for a second auger; and
- distributing the plurality of output signals,
- wherein the first auger is a rear auger and the second auger is a front auger, such that the position of the rear auger is determined relative to the position of the front auger,
- wherein the relative positions of the front and rear augers are angular positions defined by a smallest radial angle theta between corresponding radial points on the front and rear augers, and
- wherein the angle theta indicates the angular position of the rear auger in a clockwise or counter-clockwise direction relative to the angular position of the front auger.

18. The method according to claim 17, wherein at least a part of the data input is entered by an operator.

19. The method according to claim 17, further comprising:
- controlling a plurality of motors via output signals from the processing unit, wherein the plurality of motors drive the plurality of augers in accordance with the plurality of output signals received.

20. The method according to claim 17, further comprising:
- providing a digital control unit as the data input unit; and
- entering data input into the digital control unit,
- wherein the entering data input includes entering information for a process to be performed by the plurality of augers, and
- wherein the information includes one or more of a type of material being processed, a weight of the material being processed, a stage of processing the material, a torque to be applied to one or more of the plurality of augers, a rotational speed at which one or more of the plurality of augers is to perform, and the relative position of one or more of the plurality of augers.

21. The method according to claim 20, wherein the at least one control setting is predetermined and preset in the control system, such that based on processing information, a predetermined control setting includes the relative position for one or more of the plurality of augers, and
- wherein the processing information includes one or more of a type of material being processed, a weight of the material being processed, and a stage of processing the material.

22. The method according to claim 17, wherein the first auger is a rear auger and the second auger is a front auger,
- wherein the positions of the front and rear augers are angular positions defined by a smallest radial angle theta between corresponding radial points on the front and rear augers, and
- wherein the angle theta indicates the angular position of the rear auger in a clockwise or counter-clockwise direction relative to the angular position of the front auger.

23. The method according to claim 17, wherein the at least one control setting for the first auger further includes a rotational speed.

24. An auger mixing apparatus, comprising:
- a plurality of augers;
- a motor attached to each of the plurality of augers; and
- a control system configured to output auger control settings to each motor individually, wherein the control settings include at least a position for one or more augers of the plurality of augers,
- wherein the plurality of augers includes a first auger that is a rear auger and second auger that is a front auger, such that the position of the rear auger is determined relative to the position of the front auger,
- wherein the relative positions of the front and rear augers are angular positions defined by a smallest radial angle theta between corresponding radial points on the front and rear augers, and
- wherein the angle theta indicates the angular position of the rear auger in a clockwise or counter-clockwise direction relative to the angular position of the front auger.

25. The auger mixing apparatus according to claim 24, wherein the radial point is a location coincident with leading edges of helical flightings of the front and rear augers, respectively.

26. The auger mixing apparatus according to claim 24, wherein the radial point is a location on corresponding knives attached to the front and rear augers, respectively.

27. The auger mixing apparatus according to claim 24, wherein the radial point is a location on corresponding kickers attached to the front and rear augers, respectively.

28. The auger mixing apparatus according to claim 24, wherein the control system includes a data input unit for an operator to enter information regarding a process to be performed by the auger mixing apparatus.

29. The auger mixing apparatus according to claim 28, wherein the data input unit includes a plurality of predetermined control settings for selection by an operator.

30. The auger mixing apparatus according to claim 24, wherein the control settings further include a rotational speed.

* * * * *